United States Patent [19]

Zathy

[11] 4,173,147
[45] Nov. 6, 1979

[54] MILES TO KILOMETERS SPEED AND DISTANCE INDICATORS CONVERTER

[76] Inventor: Steve Zathy, 1709 Bloor W., Ste. 202, Toronto, Ontario, Canada, M6P 1B2

[21] Appl. No.: 861,982

[22] Filed: Dec. 19, 1977

[51] Int. Cl.² .............................................. G01P 1/04
[52] U.S. Cl. ......................................... 73/532; 74/12; 74/414; 116/57
[58] Field of Search ........... 116/DIG. 47, 116, 129 R, 116/57; 74/412 R, 414, 12; 73/432 A, 488, 532, 530

[56] References Cited
U.S. PATENT DOCUMENTS
2,810,362 10/1957 Lindheim .............................. 116/116

Primary Examiner—S. Clement Swisher
Assistant Examiner—Denis E. Corr

[57] ABSTRACT

This invention is a devise which when installed into its monitoring location in conjunction with vehicles transmission, shall increase the rotation of the speedometer cable and as a result, speedometer dials and odometers indicating speed and distance in miles shall automatically correct readings to be in kilometers without the changing or modifying in anyway existing vehicle speedometer dials. Removal of the devise, permits dials to again be read in miles. Installation and removal are very simple.

1 Claim, 4 Drawing Figures

MILES TO KILOMETERS SPEED AND DISTANCE INDICATORS CONVERTER

This invention is new and applicable to the improvement in speed indicators and provides the necessary means of altering through its mechanism a ratio change to indicators created to be read miles to now be read where applicable in kilometers without necessity of altering the components nor the facings of speedometers as all of the changes required are acheived by altering the ratio of calibration by means of the novel features and arrangement of parts that are cause of and occuring prior to the recording of speed which is henceforth read as kilometers yet has provision for removal of the invention to return to mileage reading without mechanical or any other form of adjustment.

The invention, features of construction, combination and arrangement of parts, hereinafter fully described, claimed and illustrated in the accompanying drawings, forming part of this specification, and in which similar characters of reference indicate corresponding parts and in which:

FIG. 1 is cross sectional view of male counterpart of the miles to kilometers converter, the left half being the case of the finished housing, the right half being the cut-away view of the gear assembly.

Figure 1:
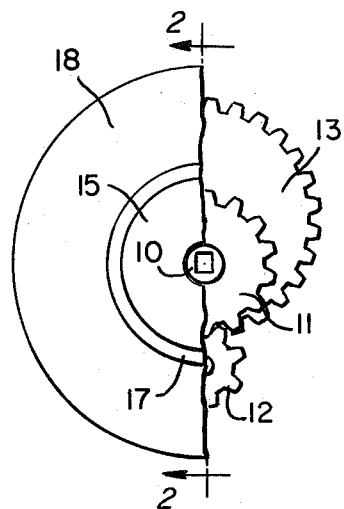
FIG. 1 is a front elevation view of the converter with the right hand half of the housing broken away to show the gears.
Figure 2:
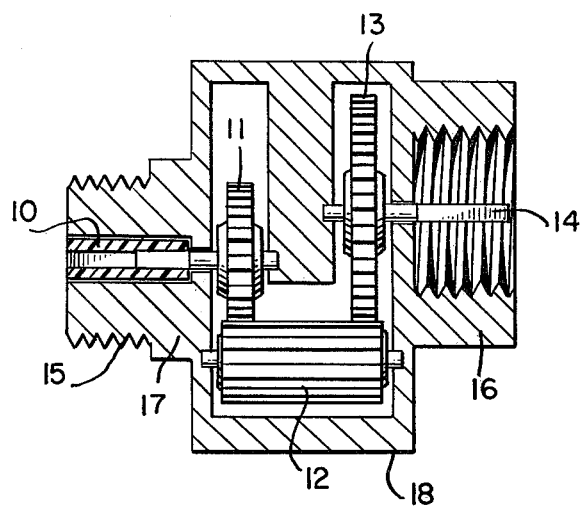
FIG. 2 is a cross sectional view through the converter taken in a plane including the axes of the spindles.
Figure 3:
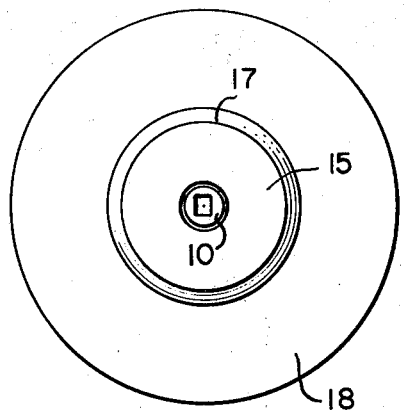
FIG. 3 is a rear elevation view of the converter.

FIG. 2 is a cross sectional cut-away view of the internal mechanism and refers more particularily to the gears and meshing in relation to the turning at calibrated ratio of the first and second spindles noted as 10 and 14 as follows; the femaled prong spindle, hollowed 10 to be receiver of the speedometer cable adapter, which adapter is fastened to and held by coupler 15 either a pressure sensitive or screw on coupler or apparatus as is connector type requirement, which when once applied is caused to engage a first gear 11 that meshes with idler gear 12 which in turn will mesh with a second gear 13, a parallel gear to 11 and effectively creates calibrating of the turns of the second spindle 14, within the male coupler 16 which in turn is pressure sensitive or otherwise coupled to the transmission or similar monitoring mechansim of the vehicle. The housing 18 has a partition extending down from its annular wall toward the idler gear 12, and the partition has opposed bearing holes in it to support the ends of the spindles. FIG. 3 represents the end view of the unit housing 18 as viewed from opposite side of FIG. 1.

Figure 4:
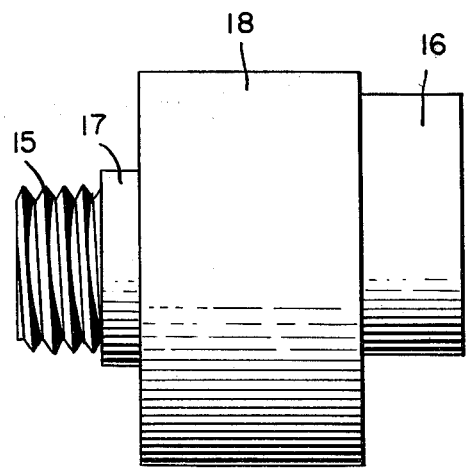
FIG. 4 is a side elevation view of the converter.

FIG. 4 represents the closed unit as viewed from top or side and displays locking fasteners shown as 16 and 17, housing face shown as 18.

I claim:

1. A converter to be connected between a vehicle transmission and a vehicle speedometer having a speedometer cable connected between the speedometer and the transmission by disconnectable couplings, the converter converting calibration of the speedometer between miles per hour and kilometers per hour, comprising:

a housing having an annular wall joining two opposed end walls;

a first spindle entering the housing through a first end wall and supporting a first gear near the end of the spindle inside the housing;

a second spindle entering the housing through the second end wall and supporting a second gear near the end of the spindle inside the housing, the first and second gears having different numbers of teeth in the ratio of miles to kilometers;

first and second coupling means outside the housing and respectively surrounding the spindles and cooperative to receive said disconnectable couplings;

an idler gear journaled in the housing between the end walls and offset from said spindles, the idler gear meshing with said first and second gears; and a partition in said housing extending between the first and second gears from the annular wall opposite the idler gear toward the idler gear, the partition having bearing holes therein respectively located opposite said spindles and supporting the inner ends of the spindles.

* * * * *